United States Patent
Smith et al.

(10) Patent No.: US 9,500,085 B2
(45) Date of Patent: Nov. 22, 2016

(54) METHOD FOR MODIFYING GAS TURBINE PERFORMANCE

(75) Inventors: Paul Kendall Smith, Simpsonville, SC (US); Sylvain Pierre, Greer, SC (US); Dennis Scott Holloway, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1126 days.

(21) Appl. No.: 13/555,434

(22) Filed: Jul. 23, 2012

(65) Prior Publication Data

US 2014/0020395 A1    Jan. 23, 2014

(51) Int. Cl.
| F04D 29/44 | (2006.01) |
| F04D 29/54 | (2006.01) |
| F04D 27/02 | (2006.01) |
| F04D 29/02 | (2006.01) |
| F01D 5/14 | (2006.01) |

(52) U.S. Cl.
CPC ......... *F01D 5/142* (2013.01); *F05D 2220/321* (2013.01); *F05D 2220/3216* (2013.01); *Y02T 50/673* (2013.01)

(58) Field of Classification Search
CPC .. F01D 5/141; F01D 5/142; F05D 2220/321; F05D 2220/3216; F05D 2230/50; F05D 2230/51; F05D 2240/301; F05D 2240/303; Y10T 29/49321; Y10T 29/49323
USPC ........................ 415/199.5, 193, 1; 416/198 R
See application file for complete search history.

(56) References Cited

U.S. PATENT DOCUMENTS

| 5,486,091 | A | 1/1996 | Sharma |
| 6,174,129 | B1 | 1/2001 | Mazzola et al. |
| 6,402,458 | B1 | 6/2002 | Turner |
| 6,527,503 | B2 * | 3/2003 | Spano et al. ............. 415/1 |
| 6,554,562 | B2 | 4/2003 | Dudebout et al. |
| 7,685,731 | B1 | 3/2010 | Petroskie et al. |
| 2005/0207893 | A1 * | 9/2005 | Chandraker ........... 416/223 R |
| 2006/0257238 | A1 * | 11/2006 | Fiala ......................... 415/1 |
| 2009/0155062 | A1 | 6/2009 | Guimbard et al. |
| 2010/0054929 | A1 | 3/2010 | Ning et al. |
| 2010/0122538 | A1 | 5/2010 | Ning et al. |

OTHER PUBLICATIONS

Off-Design Performance of a Multi-Statge Supersonic Turbine, AIAA 2003-1212, Daniel J. Dorney et al, 41th Aerospace Sciences Meeting & Exhibit, Jan. 6-9, 2003, Reno, NV.*

* cited by examiner

*Primary Examiner* — Kenneth Bomberg
*Assistant Examiner* — Deming Wan
(74) *Attorney, Agent, or Firm* — Dority & Manning, PA

(57) ABSTRACT

A method for enhancing one or more performance parameters of a gas turbine having at least one row of clocked airfoils may generally include choosing a first, a second and a third row of airfoils where the third row is clocked relative to the first row. An unsteady computational fluid dynamics model may be used to determine at least one wake parameter of a working fluid flowing from the second row of the airfoils to the third row of the airfoils. At least one design parameter of the airfoils of the second row may be modified, and the unsteady computational fluid dynamics model may then be used to determine the effect of the airfoil design parameter modification on the at least one wake parameter. The effect on the wake parameter may be compared to a predetermined target range.

18 Claims, 7 Drawing Sheets

METHOD FOR MODIFYING GAS TURBINE PERFORMANCE

FIELD OF THE INVENTION

This present application relates to turbine engines. More specifically, but not by way of limitation, the present application relates to a method for modifying performance parameters of a turbine engine having at least one row of clocked airfoils.

BACKGROUND OF THE INVENTION

A gas turbine engine typically includes a compressor, a combustor, and a turbine section. The compressor and turbine section may generally include rows of airfoils or blades that are axially stacked in stages. Each stage generally includes a row of circumferentially spaced stator blades or nozzles which are fixed in position, and a set of circumferentially spaced rotor blades, that rotate about a central axis or shaft. In operation, the rotor blades in the compressor rotate about a rotor shaft to compress a flow of air. The supply of compressed air may be combined with a fuel to form a combustible mixture within a combustion zone of the combustor. The combustible mixture is burned to provide a rapidly expanding hot gas. The resulting flow of hot gas expands through the turbine section, which causes the turbine rotor blades to rotate about the rotor shaft and/or a turbine shaft. In this manner, energy from the hot gases may impart kinetic energy to the blades of the turbine section, thereby causing the rotor shaft and/or the turbine shaft to rotate. The rotating shaft may be used to drive a load such as a generator to generate electricity.

In some gas turbines, adjacent stages of stator blades may be configured with substantially the same number of circumferentially spaced stator blades. In addition or in the alternative, adjacent stages of rotor blades may be configured with substantially the same number of circumferentially spaced rotor blades. In an effort to improve the aero-efficiency, efforts have been made to index or "clock" the circumferential positions of the stator and/or rotor blades in one stage relative to the circumferential position of the stator and/or rotor blades in nearby or neighboring stages.

Various methods for determining an optimized clocking angle between adjacent stages of stator and/or rotor blades currently exist. However, it has been discovered that such conventional clocking methods may increase the mechanical stresses acting on certain airfoils during operation. Clocking angles may be generally determined during a design or a redesign phase of the gas turbine section by using steady and unsteady state computational fluid dynamic (CFD) computer modeling. For example, current design methods may generally model a baseline fluid flow profile across three or more alternating rows of adjacent stator and/or rotor blades. In particular, the model may be used to determine various parameters from the fluid flow profile such as wake formation and wake shape of the fluid as it flows from a trailing edge of a second row of the blades downstream towards the leading edge of an adjacent third row of the blades. As a result, designers may then clock the third row of blades based on the modeled fluid flow profile so as to optimize the fluid flow through the compressor and/or the turbine section.

The primary issue is that actual clocking generally takes place during assembly of the gas turbine. Therefore, once the various stages of stator blades and/or rotor blades have been clocked into a certain position and the gas turbine fully assembled, modification of the clock angles of the various stages of the stator and/or rotor blades so as to improve the thermal, mechanical and/or the aerodynamic performance of the gas turbine may be generally impractical. As a result, undesirable mechanical stresses on the airfoils and/or undesirable effects on gas turbine performance may be too difficult and/or too expensive to mitigate. Therefore, a new method for enhancing the performance of a gas turbine with fixed clocked stages of stator blades and/or rotating blades would be useful.

BRIEF DESCRIPTION OF THE INVENTION

Aspects and advantages of the invention are set forth below in the following description, or may be obvious from the description, or may be learned through practice of the invention.

One embodiment of the present invention is a method for enhancing one or more performance parameters of a gas turbine that generally includes at least one row of clocked airfoils. The method may generally include choosing a first, a second and a third row of the airfoils wherein the third row is clocked relative to the first row. The method further includes utilizing an unsteady computational fluid dynamics model to determine at least one wake parameter of a working fluid that flows from the second row of the airfoils to the third row of the airfoils. At least one airfoil design parameter of the airfoils of the second row may be modified. The unsteady computational fluid dynamics model may be utilized to determine the effect of the modification of the at least one airfoil design parameter on the at least one wake parameter. The method may further include comparing the at least one wake parameter to a predetermined target range.

Another embodiment of the present invention is a method for enhancing one or more performance parameters of the gas turbine having at least one row of clocked airfoils. The method generally includes choosing a first, a second and a third row of the airfoils wherein the third row is clocked relative to the first row. The method further includes utilizing a computational fluid dynamics model so as to determine at least one wake parameter of a working fluid flowing from the airfoils of the second row towards the airfoils of the third row at one or more positions defined along a radial span of the airfoils of the third row. At least one airfoil design parameter of the airfoils of the second row may be modified within the computational fluid dynamics model. The computational fluid dynamics model may be utilized so as to determine the effect of modifying the at least one design parameter of the airfoil of the second row, and the at least one wake parameter may be compared to a predetermined target range.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
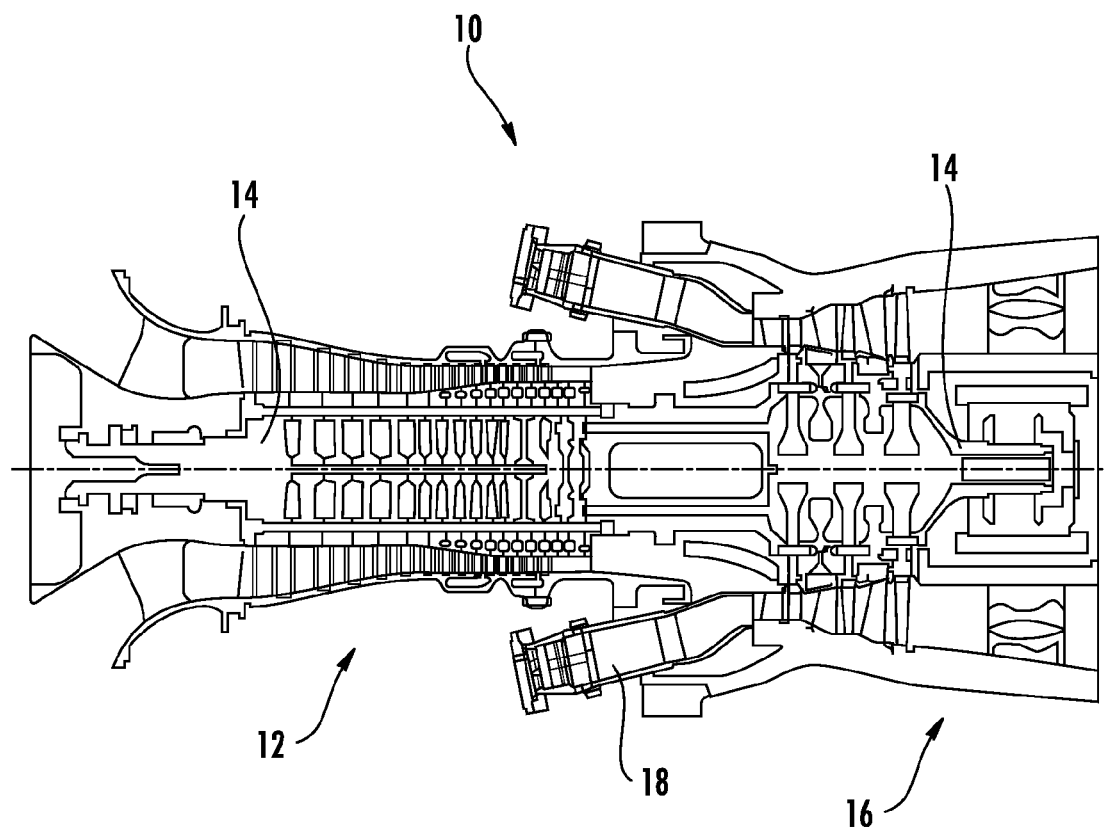
FIG. 1 is a schematic representation of an exemplary gas turbine in which embodiments of the present disclosure may be used.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify a specific location or importance of the individual components. In addition, the terms "upstream" and "downstream" refer to the relative location of components in a fluid pathway. For example, component A is upstream from component B if a fluid flows from component A to component B. Conversely, component B is downstream from component A if component B receives a fluid flow from component A.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Various embodiments of the present invention include a method for enhancing the performance of a gas turbine having at least one row of clocked airfoils within the gas turbine. The gas turbine may generally include a first row of airfoils at a first angular position relative to an axial centerline of a shaft that extends at least partially through the gas turbine. A second row of airfoils may be disposed axially downstream from and generally adjacent to the first row of airfoils. A third row of airfoils may be disposed axially downstream from the second row of airfoils. The third row of airfoils may be set at a second angular position relative to the axial centerline of the shaft. In particular embodiments, the first and third rows of airfoils may include a plurality of stator (stationary) airfoils and the second row may include a plurality of rotating airfoils that rotate between the first and third rows of stator airfoils. In alternate embodiments, the first and third rows of airfoils may comprise of the plurality rotating airfoils and the second row of airfoils may include the plurality of stator airfoils.

In one embodiment, the method may generally include, but not in any particular order, determining at least one performance parameter of the gas turbine to be modified, determining at least one wake parameter such as circumferential wake width of a fluid flowing from the second row of airfoils to the third row airfoils at one or more positions defined along a radial span of each or some of the plurality of airfoils of the third row. In particular embodiments, the at least one wake parameter may be determined by the use of an unsteady computational fluid dynamics computer model. Upon determining a baseline of the at least one wake parameter, at least one airfoil design parameter of each or some of the airfoils of the second row may be modified within the unsteady computational fluid dynamics computer model so as to modify the wake parameter at the one or more positions defined along the radial span of each or some of the airfoils of the third row. The unsteady computational fluid dynamics computer model may be repeated with the modifications to the airfoils of the second row so as to evaluate the effect on the wake parameter as compared to the baseline. As a result, the effect on the modified wake parameter may be correlated to the at least one performance parameter of the gas turbine. If the modification to the airfoil design parameter of airfoils of the second row achieves the desired effect, the method may be ended. However, if the airfoil design parameter modification yields a less than desirable result, the method may be repeated until a desirable effect is achieved.

FIG. 1 illustrates a schematic representation of a gas turbine 10. In general, gas turbines operate by extracting energy from a pressurized flow of hot gas that is produced by the combustion of a fuel in a stream of compressed air. As illustrated in FIG. 1, the gas turbine 10 may be configured with an axial compressor 12 that is mechanically coupled by at least one shaft 14 or rotor to a turbine section 16 downstream from the compressor 12, and at least one combustor 18 positioned between the compressor 12 and the turbine section 16. Note that the following invention may be used in all types of turbine engines, including gas turbine engines, steam turbine engines, aircraft engines, and others. Further, the invention described herein may be used in turbine engines with multiple shaft and reheat configurations, as well as, in the case of gas turbine engines, with combustors of varying architecture, for example, annular or can combustor configurations. Hereinafter, the invention will be described in relation to an exemplary gas turbine engine, as depicted in FIG. 1. As one of ordinary skill in the art will appreciate, this description is exemplary only and not limiting in any way.

Figure 2:
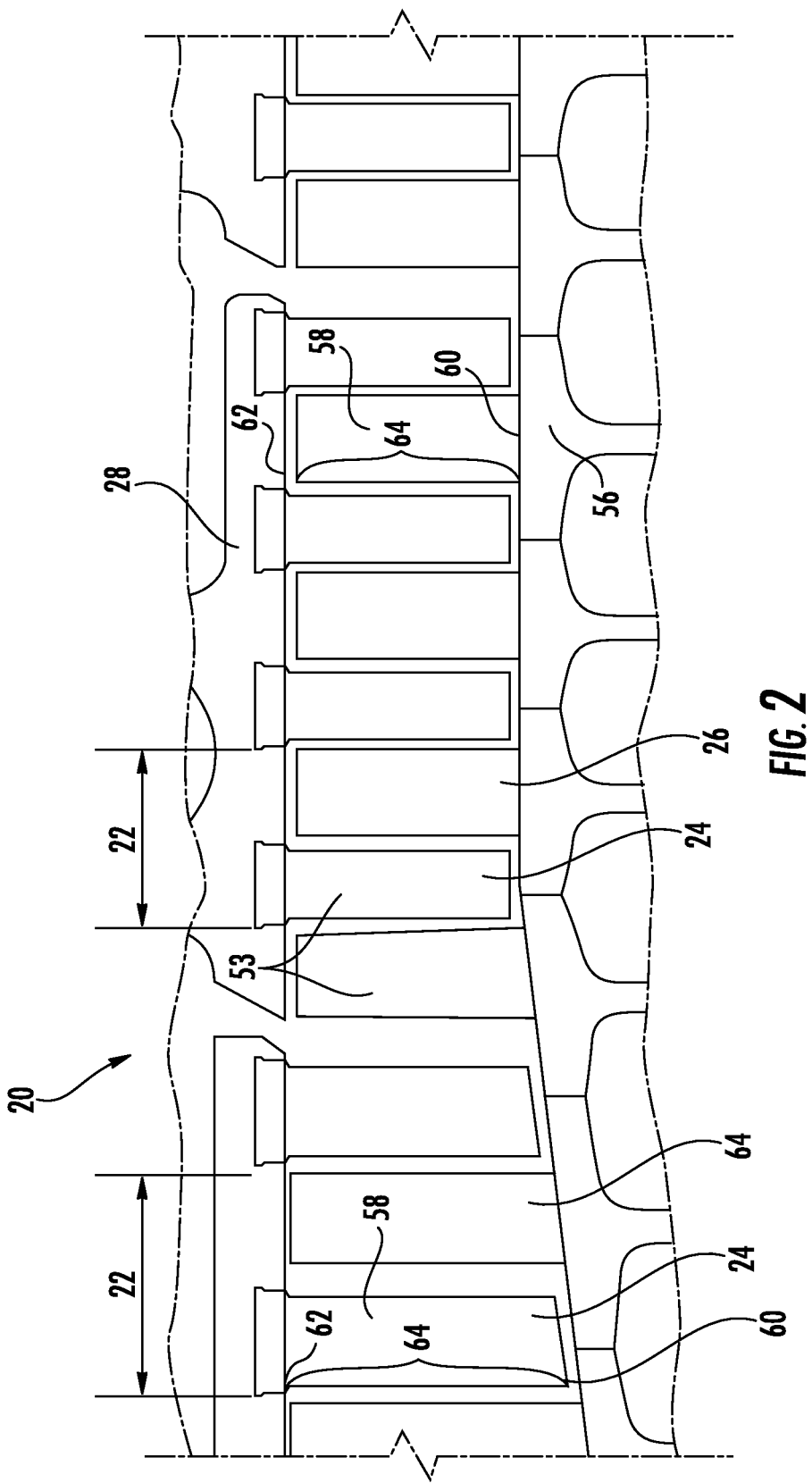
FIG. 2 illustrates a sectional view of a compressor in a gas turbine in which embodiments of the present disclosure may be used.

FIG. 2 illustrates an enlarged partial view of an exemplary multi-staged axial compressor 20 that may be used in the gas turbine 10 as shown in FIG. 1. As shown in FIG. 2, the compressor 20 may include a plurality of stages 22. Each stage 22 may include a row of compressor stator blades 24 followed by a row of compressor rotor blades 26. Thus, a first stage 22 may include a row of the compressor stator blades 24, which remain stationary during operation of the compressor 20, followed by a row of the compressor rotor blades 26 which rotate about the shaft 14 as shown in FIG. 1. The compressor stator blades 24 of each stage 22 may be arranged in a generally annular array about the axial centerline of the shaft 14 shown in FIG. 1, where each of the compressor stator blades 24 are circumferentially spaced one from the other and fixed in position. For example, as shown in FIG. 2, the compressor stator blades 24 of each stage 22 may be fixed to an outer casing 28 of the gas turbine 10. As one of ordinary skill in the art will appreciate, the compressor rotor blades 26 may be configured such that, when spun about the shaft 14, kinetic energy may be imparted to the air or working fluid flowing through the compressor 20. As one of ordinary skill in the art will appreciate, the compressor 20 may have many other stages beyond the stages 22 that are illustrated in FIG. 2. Each additional stage may include a plurality of circumferentially spaced compressor stator blades 24 followed by a plurality of circumferentially spaced compressor rotor blades 26.

Figure 3:
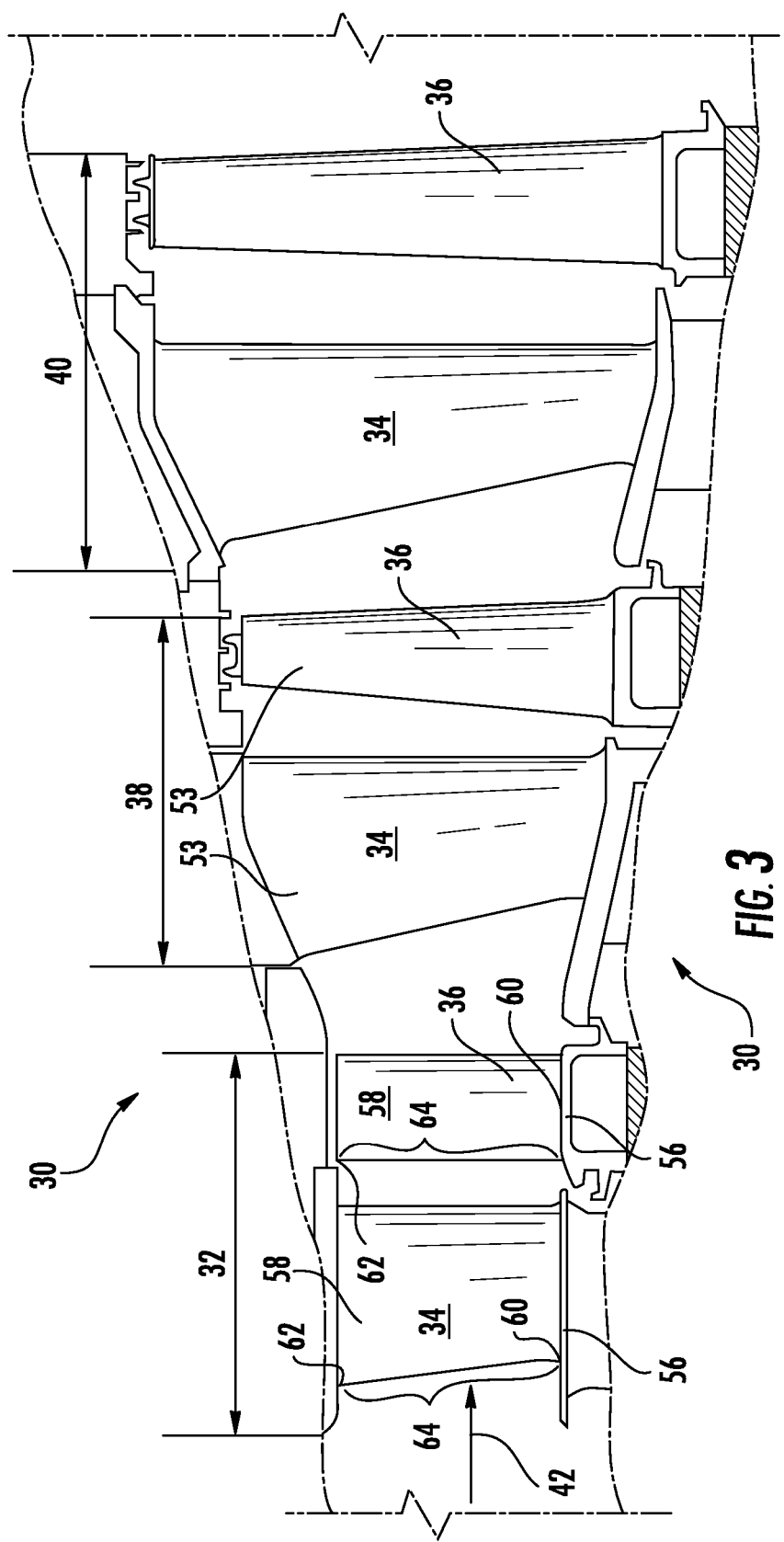
FIG. 3 illustrates a sectional view of a turbine section in a gas turbine in which embodiments of the present disclosure may be used.

FIG. 3 illustrates a partial view of an exemplary turbine section 30 that may be used in the gas turbine engine 10 as shown in FIG. 1. As shown in FIG. 3, the turbine section 30 may include a plurality of stages 32. Although three exemplary stages 32 are illustrated, the turbine section 30 may include more or less stages 32 than illustrated. A first stage 32 generally includes a plurality of nozzles or turbine stator blades 34, which remain stationary during operation, and a plurality of turbine buckets or turbine rotor blades 36, which rotate about the shaft 14 during operation. The turbine stator blades 34 may be generally circumferentially spaced one from the other and fixed about the axis of rotation of the at least one shaft 14 that runs generally axially through the turbine section 18 shown in FIG. 1.

The turbine rotor blades 36 may be mounted on a turbine disk (not shown) which may be coupled to the at least one shaft 14 shown in FIG. 1, for rotation about the axis of rotation of the shaft 14. As illustrated in FIG. 3, a second stage 38 of the turbine section 30 may similarly include a plurality of circumferentially spaced turbine stator blades 34 followed by a plurality of circumferentially spaced turbine rotor blades 36 mounted on a turbine wheel (not shown) for rotation. A third stage 40 is illustrated, and similarly includes a plurality of circumferentially spaced turbine stator blades 34 and turbine rotor blades 36. It will be appreciated that the turbine stator blades 34 and turbine rotor blades 36 lie in a hot gas path of the turbine section 30. The direction of flow of the hot gases through the hot gas path is indicated by the arrow 42. As one of ordinary skill in the art will appreciate, the turbine section 30 may have more or less stages 38 than shown in FIG. 3. Each additional stage may include a plurality of circumferential spaced turbine stator blades 34 followed by a plurality of circumferentially spaced turbine rotor blades 36. In alternate turbine section designs, the first stator blades 34 of the first stage 32 may be disposed at least partially upstream from the turbine section 30.

Note that as used herein, without further specificity, reference to "rotor blades 50" is a reference to the rotating blades of either the compressor 20 or the turbine section 30, which include both compressor rotor blades 26 and turbine rotor blades 36. Reference, without further specificity, to "stator blades 52" is a reference to the stationary blades of either the compressor 20 or the turbine section 30, which include both compressor stator blades 24 and turbine stator blades 34. The term "airfoil" will be used herein to refer to either rotor or stator blades 50, 52. Thus, without further specificity, the term "airfoil" is inclusive to all type of turbine engine blades, including compressor rotor blades 26, compressor stator blades 24, turbine rotor blades 36, and turbine stator blades 34. Reference, without further specificity, to "working fluid" is a reference to any fluid such as the hot gas flowing through the turbine section or air flowing through the compressor.

As shown in FIGS. 2 and 3, each airfoil may generally include a platform 56 and a blade 58 that extends from the platform 56. The blade 58 generally includes a root 60 at the interface with the platform 56, and a tip 62 at a distal end of the blade 58 from the root 60. A radial distance between the root 60 and the tip 62, herein referred to as "radial span 64", may be referenced by a percentage of the overall radial distance between the root 60 and the tip 62. For example, a point that is generally half the distance between the root and the tip may be referenced as being at fifty percent of the radial span 64. As shown in FIG. 2, the compressor stator blades 24 may not include a platform 56.

In use, the rotation of the compressor rotor blades 26 within the axial compressor 20 may compress a flow of air. The flow of air may enter the combustor 18 and may be mixed with a fuel to form a combustible mixture. The combustible mixture may be burned in the combustor 18, thereby producing a rapidly expanding hot gas. The hot gas may be directed from the combustor 18 through the first stage 32 of the turbine section 16, which may induce the rotation of the at least one shaft 14, thereby transforming the energy of the hot gas into mechanical energy of the rotating shaft 14. The mechanical energy of the at least one shaft 14 may then be used to drive the rotation of the compressor rotor blades 24 and/or an external load such as a generator so as to produce electricity.

Often, in both gas turbine compressors 20 and turbine sections 30, nearby or neighboring rows of airfoils may have substantially the same configuration, i.e., have the same number of similarly sized airfoils that are spaced similarly around the circumference of the row. When this is the case and, in addition, when two or more rows of airfoils operate such that there is no relative motion between each (as would be the case, for example, between two or more rows of rotor blades or two or more rows of stator blades), the airfoils in these rows may be "clocked." As used herein, the term "clocked" or "clocking" refers to the fixed circumferential positioning of airfoils in one row in relation to the circumferential positioning of the same type of airfoils in nearby rows. Clocking may generally be used to improve turbine section efficiency and/or enhance aeromechanical performance of the airfoils within the gas turbine by at least partially aligning the working fluid flowing from a trailing edge of a row of airfoils towards or away from the leading edge of an adjacent downstream row of airfoils.

Figure 4:
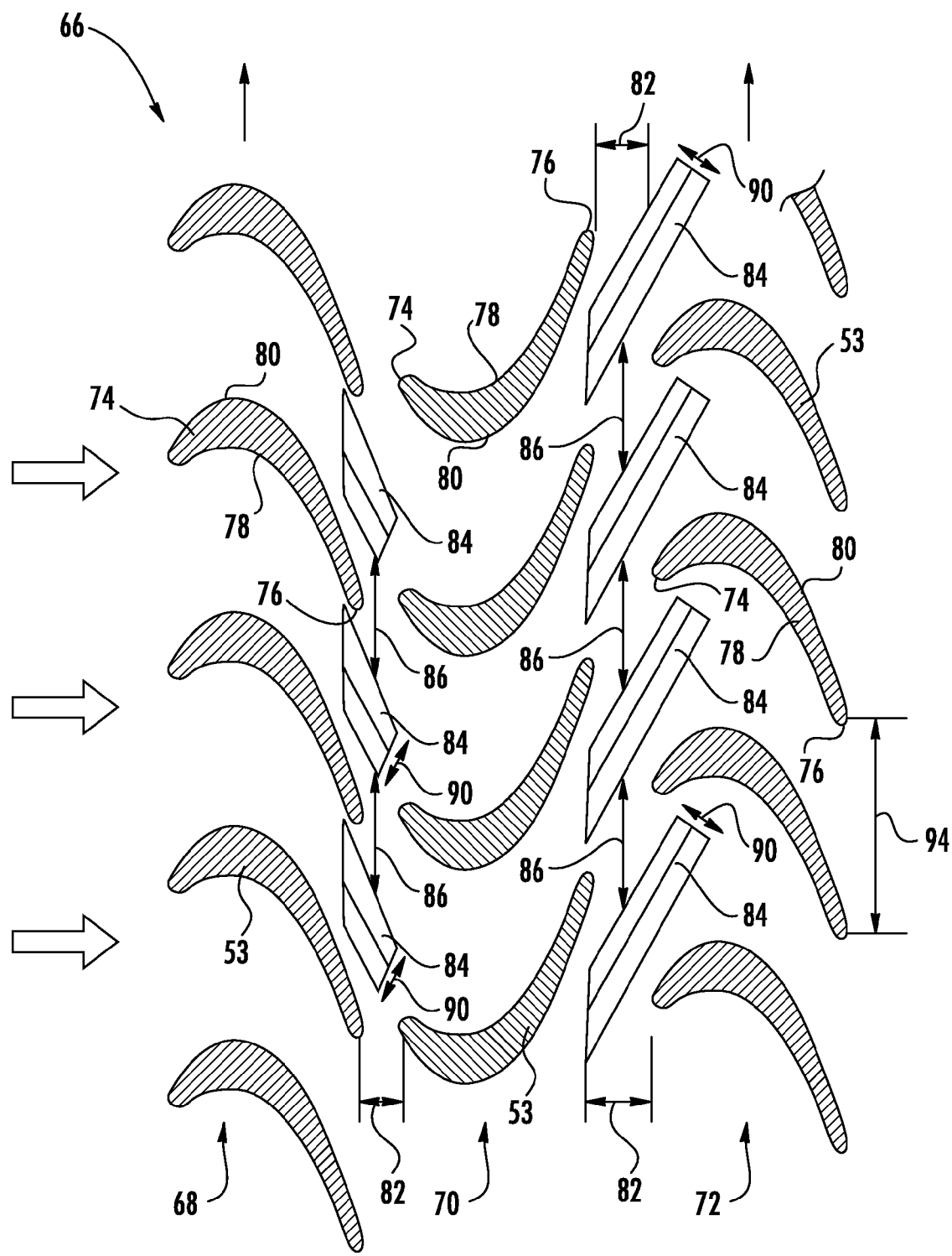
FIG. 4 illustrates a schematic representation of a first, a second and a third row of airfoils within a gas turbine.

FIG. 4 illustrates a simplified schematic representation of three adjacent rows of airfoils 66. The three adjacent rows generally include a first row 68, a second row 70 and a third row 72. Each airfoil may generally include a leading edge 74, a trailing edge 76, a pressure side 78 and a suction side 80. As shown in FIG. 4, the third row 72 may be clocked or offset relative to the first row 68. For example, as shown, the leading edges 74 of the airfoils of the third row 72 may be circumferentially offset from the leading edges 74 of the airfoils of the first row 68. In particular embodiments, the first row 68 and the third row 72 may each represent a row of the rotor blades 50, and the second row 70 may represent a row of the stator blades 52. In the alternative, as one of ordinary skill in the art will appreciate, the first and third rows 68, 72 may each represent a row of the stator blades 52, and the second row 70 may represent a row of the rotor blades 50. As one of ordinary skill in the art will appreciate, the first and third rows 68 and 72, whether they are stator blades 50 or rotor blades 52, have substantially no relative motion between them (i.e., both remain stationary or both rotate at the same velocity during operation). In addition, both the first and third rows 68 and 72, have substantially the same relative motion in relation to the second row 70 (i.e., both of the first and third rows 68 and 72, rotate while the second row 70 remains stationary, or both of the first and third rows 68 and 72, remain stationary while the second row 70 rotates).

As shown in Fig. 4, a flow volume 82 may be at least partially defined between the trailing edge 76 of the airfoils of a particular row and the leading edge 74 of the airfoils of an adjacent downstream row. For example, the flow volume 82 may be defined between the trailing edges 76 of the airfoils of the first row 68 and the leading edges 74 of each airfoil of the second row 70, and between the trailing edges 76 of the airfoils of the second row 70 and the leading edges 74 of each airfoil of the third row 72. As the working fluid exits the trailing edges 76 of one of the rows of airfoils and flows into the flow volume 82 towards the next row of airfoils, wakes 84 are formed within the flow volumes 82. As used herein, the term "wake 84" is used to refer to a thermal wake and/or a pressure (momentum) wake in addition to any industry or common definition of the term "wake", The wakes 84 may extend partially or completely through the flow volume 82. As shown, the wakes 84 do not generally extend circumferentially across the entire flow volume 82. As such, a core flow region 86 generally forms between each wake 84. The core flow region 86 generally defines a region within the flow volume 82 where the working fluid pressure is generally higher than the pressure found within the wake 84. This can be said for temperature if the upstream airfoil is cooled as is commonly done in modern high pressure turbines.

Figure 5:
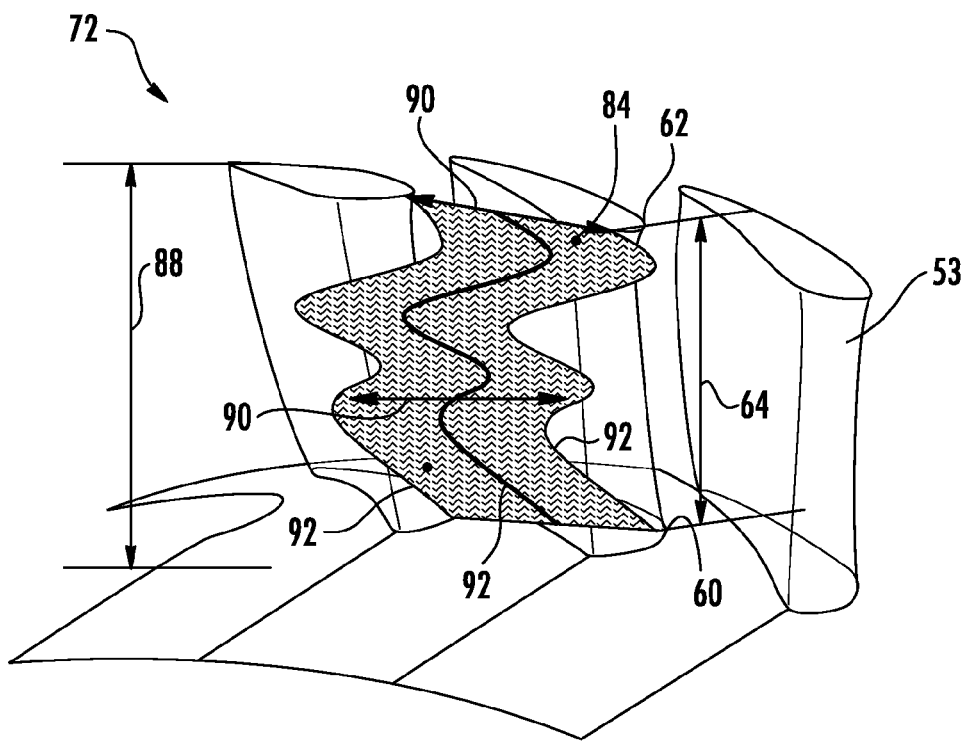
FIG. 5 illustrates a perspective view of a radial cross section of a wake with a generally constant width taken generally adjacent to the leading edge of one row of airfoils as shown in FIG. 4, according to at least one embodiment of the present disclosure.
Figure 6:
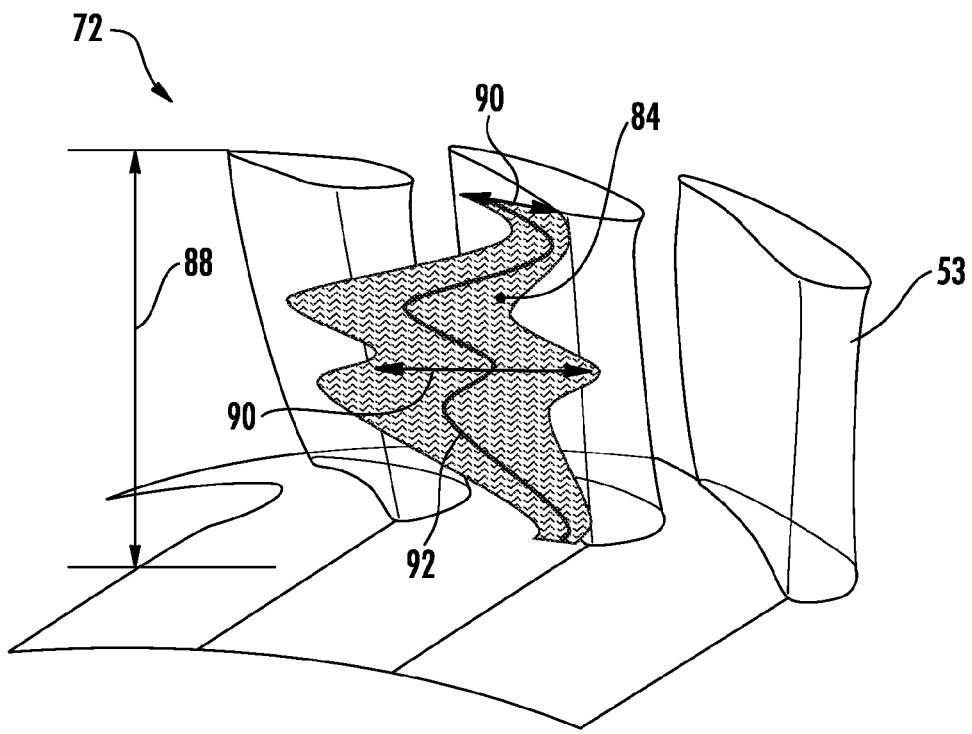
FIG. 6 illustrates a perspective view of a radial cross section of a wake with a variable wake width taken generally adjacent to the leading edge of one row of airfoils as shown in FIG. 4, according to at least one embodiment of the present disclosure.

Fig, 5 illustrates a downstream view of a radial cross section of a simplified exemplary wake having a generally constant width taken at an angle generally coincident to the leading edge of one row of the airfoils, and Fig. 6 illustrates a downstream perspective view of the simplified exemplary wake as shown in Fig. 5, having a variable wake width. As shown in FIG. 5, the wake 84 generally includes a radial height 88 and a circumferential width 90 herein referred to as the "wake width 90". The wake 84 may generally form a wake shape 92 that extends between the root 60 and the tip 62 of the airfoils. The wake shape 92 may undulate radially along the radial span 64 of the airfoil. The radial height 88 of the wake 84 may extend at least partially across the radial span 64 of the airfoil, As shown in FIG. 4, the wake width 90 may be at least partially defined by a circumferential distance herein referred to as the "pitch" between the trailing edges 76 of the row of airfoils which formed the wake 84. As shown in FIG. 4, the wake width 90 may be generally defined as a region within the flow volume 82 between two adjacent core flow regions 86. As shown in FIG. 5, the wake width 90 may remain substantially constant along the radial height 88 of the wake 84. In the alternative, as shown in FIG. 6, the wake width 90 may vary along the radial height 88 of the wake 84.

Figure 7:
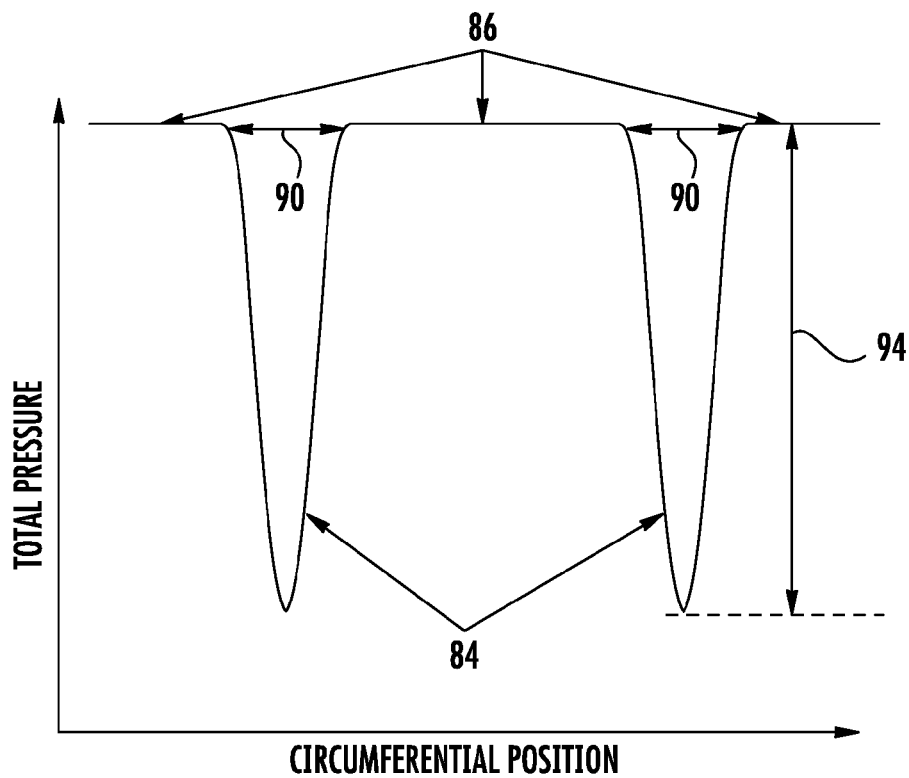
FIG. 7 provides a graphical representation of total pressure versus circumferential direction within a flow volume as shown in FIG. 4.

FIG. 7 provides a graphical representation of average total pressure within the flow volume verses circumferential position of an axial cross section of a pressure wake taken at a particular location along the radial height of the wake. As shown, the average total pressure may be generally highest within the core flow regions 86 and generally decreases across the wake width 90 until it reaches a maximum wake depth 94, generally at the center of the wake width 90, at which point the total pressure within the wake 84 is at its lowest value. Narrowing of the wake width 90 of the pressure wake 84 at particular locations along the radial span 64 of the leadings edges 74 of the airfoils shown in FIG. 6 may decrease pressure pulses or pressure variations on the airfoils at that location by increasing the generally constant pressure core flow region 86, thereby potentially enhancing the aeromechanical performance of the airfoils. In general, widening of the wake may reduce the efficiency benefits of clocking. However, widening the wake may increase the robustness of the clocking by reducing the variation in efficiency that may result from a less than optimal clocking angle. In addition or in the alternative, by widening the wake width 90 of the pressure wake 84 at particular locations along the radial span 64 of the leadings edges 74 of the airfoils 72, friction losses along the airfoils may be reduced, thereby enhancing and/or optimizing the benefits of clocking the third row 72. For example, widening the wake at a particular location along the radial span may decrease the temperature at that location.

Figure 8:
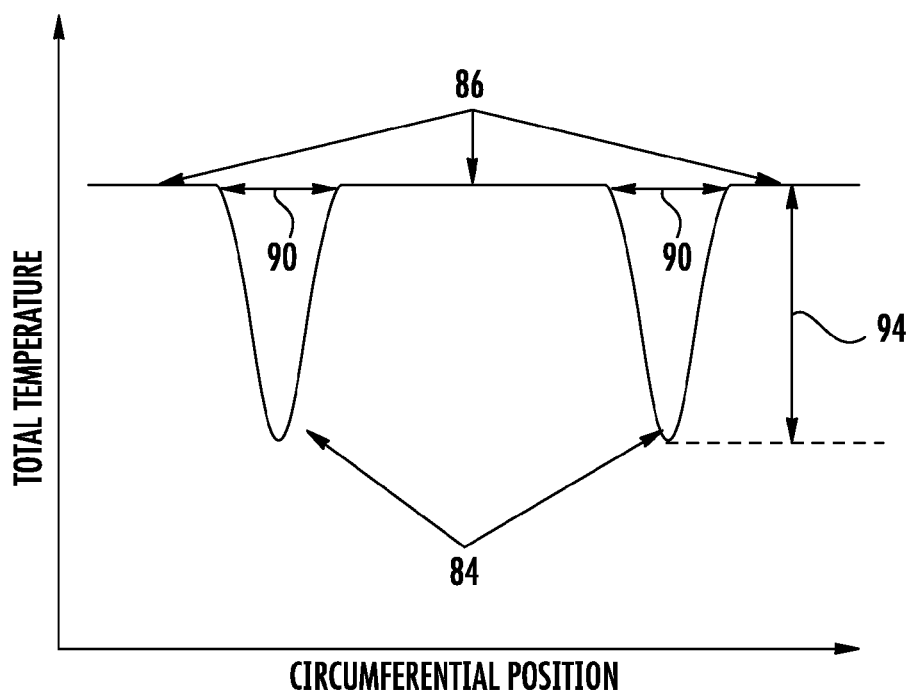
FIG. 8 provides a graphical representation of total temperature versus circumferential direction within a flow volume as shown in FIG. 4.

FIG. 8 provides a graphical representation of average total temperature within the flow volume 82 verses circumferential position of an axial cross section of a pressure wake taken at a particular location along the radial height of the wake. In this case the upstream airfoil is cooled, and thus the wake will have a decrease in total temperature relative to the core flow region. As shown, the average total temperature may be generally highest within the core flow regions 86 and generally decreases across the wake width 90 until it reaches a maximum wake depth 94, generally at the center of the wake width 90, at which point the temperature within the wake 84 is at its lowest value. Narrowing of the wake width 90 of the temperature wake 84 at particular locations along the radial span 64 of the leadings edges 74 of the airfoils as shown in FIG. 6, may result in an increased temperature at that particular location, thereby potentially reducing thermal cycle fatigue during operation of the gas turbine 10. In the alternative, widening the wake width 90 of the thermal wake 84 at a particular location along the radial span 64 of the leading edges 74 of the airfoils may result in lower temperatures at that location, thereby reducing long term thermal effects on the airfoils and/or reducing the amount of cooling required.

In particular embodiments, the first and third rows 68, 72 may comprise of stator blades 52 and the second row 70 may comprise of rotor blades 50, the wakes 84 that leave the trailing edges 76 of the stator blades 52 of the first row 68 may be chopped or disrupted by the second row 70 of rotor blades 50, thereby causing the center of the wakes 84 to undulate in a radial direction before the wakes 84 reach the leading edge 74 of the third row 72 of stator blades 52. As a result, the wake width 90 leaving the trailing edges 76 of the rotor blades 50 of the second row 70 may be shifted and/or redefined non-uniformly from the root 60 to the tip 62 of the stator blades 52 of the third row 72 such that the wake width 90 may vary radially along the center of the wake. As a result, the benefits of clocking the airfoils may affect various turbine section performance parameters such as turbine section efficiency and/or aeromechanical performance of the airfoils. For example, undesirable hot spots at particular locations along the span of the leading edges 74 of the stator blades 52 of the clocked third row 72 may be realized after the gas turbine 10 is put into operation. In addition, it may be discovered that the clocking angle or circumferential offset of the third row 72 is not optimal, thereby affecting thermal and/or mechanical performance of the gas turbine 10. However, as previously disclosed, clocking of the airfoils generally takes place during assembly of the gas turbine 10, therefore fixing the clocked rows of airfoils into position. As a result, it may not be feasible to modify the clocking angle of a gas turbine 10 that is in operation so as to account for unexpected turbine section inefficiencies, aeromechanical issues, and thermal issues such as hot spots on a downstream row of the airfoils, or to provide solutions to changing customer requirements once the gas turbine is in service.

Figure 9:
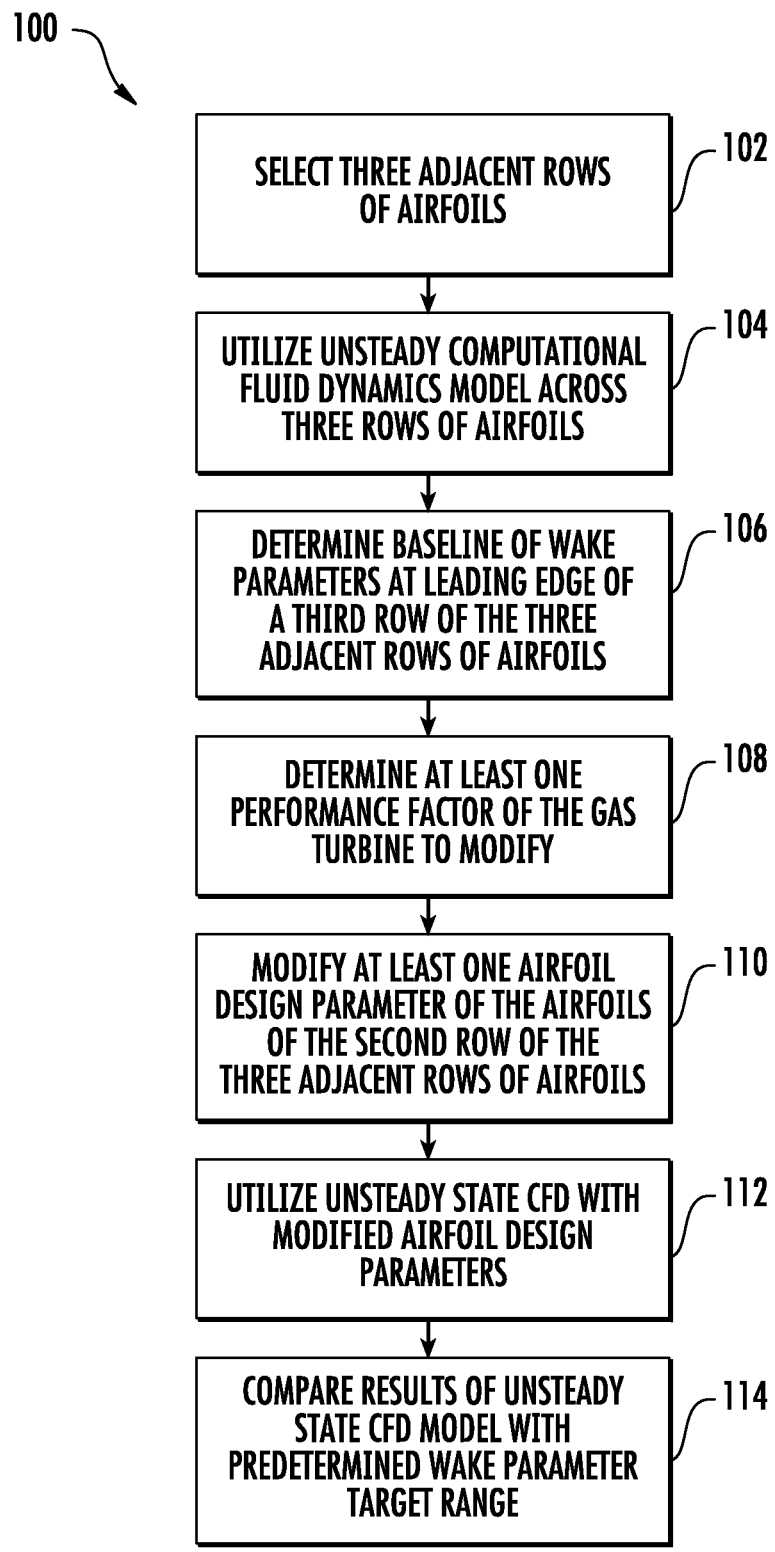
FIG. 9 illustrates a flow diagram of one embodiment of a method described within the current disclosure.

FIG. 9 depicts an exemplary flow diagram for a method 100 to enhance one or more performance parameters of the gas turbine 10 having at least one row of clocked airfoils. In particular, the pressure and/or the thermal wake width 90 may be modified at predetermined locations along the radial span 64 of the airfoils of the clocked row by manipulating one or more design parameters of the airfoils upstream and/or generally adjacent to the airfoils of the clocked row. Performance parameters of the gas turbine 10 may include but are not limited to, turbine section efficiency, aeromechanical and/or thermal performance of the clocked airfoils and overall performance of the gas turbine. The method 100 may be used to retro-fit existing gas turbines and/or to design new gas turbine models. The method 100 may be implemented using any suitable computing device. In addition, although FIG. 9 depicts steps performed in a particular order for purposes of illustration and discussion, the steps of method 100 as discussed herein are not specifically limited to any particular order or arrangement. One skilled in the art, using the disclosures provided herein, will appreciate that various steps of the method 100 can be omitted, rearranged, repeated, combined and/or adapted in various ways.

At 102, the method generally includes selecting at least three adjacent rows, as shown in FIG. 4, of airfoils from either the compressor or the turbine section. In particular embodiments, the first row 66 and the third row 70 may comprise of stator blades, and the second row 68 may comprise of rotor blades. In the alternative, the first row 66 and the third row 70 may comprise of rotor blades, and the second row 68 may comprise of stator blades. The third row may be clocked relative to the first row. At least three rows of the airfoils may be required so as to analyze any impacts that clocking may have on various wake parameters such as the wake width of the working fluid as it flows from the trailing edges of the airfoils of the first row to the leading edges of the clocked airfoils of the third row. Wake parameters may include, but are not limited to, wake width, wake shape and wake height.

At 104, the method 100 includes utilizing a computational fluid dynamics model herein referred to as the "CFD model" on the three rows of chosen airfoils so as to determine a baseline of various wake parameters of the working fluid as it flows from the trailing edges of the airfoils of the first row to the leading edges of the clocked airfoils of the third row. The CFD model may be based on steady state and/or unsteady state boundary conditions. In particular embodiments, the unsteady CFD model may be required so as to determine the effects of clocking on the wake parameters as the working fluid approaches and/or intersects with the leading edges of the airfoils of the clocked third row. Examples of the wake parameters may include, but are not limited to the wake width 90, wake height, and wake shape. The wake 84 may represent pressure and/or thermal wakes 84. The CFD model may use a Navier-Stokes based solver or any other solver suited to solve steady state or unsteady state fluid dynamics models. The CFD model may be based on various boundary conditions such as but not limiting of, a compressible working fluid, a fixed first row, a rotatable second row, a fixed third row, a rotatable first row, a fixed second row, a rotatable third row and a clocked third row. In addition, the CFD model may be based on various aeromechanical boundary conditions such as but not limiting of, the shape, pitch, stagger, lean, tilt, the number of airfoils in each row, load distribution of the airfoils, platform shape and span height of each or some of airfoils the rows of airfoils.

At 106, the method 100 includes determining a baseline of the wake parameters at or near the leading edge of the airfoils of the third row. Step 106 may be accomplished by analyzing the results of the unsteady CFD model at various locations along the radial span of the airfoils of the third row. For example, the wake width may be determined from the unsteady CFD model by analyzing circumferential entropy distribution as a function of the span of the airfoils of the third row. In particular embodiments, the wake width may be determined at specific locations along the span of the leading edges of the airfoils of the third row. For example, but not limiting of, the wake width and/or other wake parameters may be determined at the fifty percent span and/or at the one hundred percent span of the airfoils of the third row. The wake width and/or other wake parameters may be determined at any point along the flow volume between the second row and the third row of airfoils. In particular embodiments, the wake width may be determined at a point generally adjacent to the leading edge of the airfoils of the third row. In particular embodiments, the wake width may be determined at an angle that is generally coincident with the leading edge of the airfoils of the third row.

At 108, the method includes choosing at least one performance parameter of the gas turbine to be modified. For example, but not limiting of, the performance parameter may include improved thermal efficiency of the turbine section, enhanced performance of the compressor, enhanced performance of the turbine section, improved aeromechanical performance of the airfoils, improved emissions and improved benefits of clocking. The performance parameter may be derived from field data, design requirements or from customer requirements.

The performance parameter may be correlated to the wake parameters determined by the CFD model from step 106. For example, but not limiting of, a certain wake width or other wake parameters at a particular radial span location along the airfoils of the third row may be correlated to increased mechanical and/or thermal stresses on those airfoils of the clocked row. In other examples, a certain wake width or other wake parameter at a particular span location along the airfoils of the third row may be correlated to undesirable pressure losses between the rows of airfoils, thereby possibly resulting in decreased performance of the compressor and/or the turbine sections of the gas turbine and/or increased fatigue. In addition or in the alternative, the wake width and/or other wake parameters may be related to pressure variations or pulses on the airfoils of the clocked row, thereby resulting in increased mechanical fatigue on the airfoils of the third row.

At 110, the method includes modifying at least one airfoil design parameter of the airfoils of the second row so as to manipulate at least one of the wake parameters determined by the unsteady CFD model in step 106 at a particular location along the radial span of the airfoils of the third row. For example, but not limiting of, at least one of the shape, pitch, stagger, lean, tilt, the number of airfoils in the second row, load distribution of the airfoils, platform shape or span height of the airfoils of the second row may be modified. The airfoil design parameter to be modified may be selected based on the particular performance parameter to be addressed from step 108. In particular embodiments, the airfoil design parameter may be chosen to affect the wake width or some other wake parameter at a particular location along the radial span of the airfoils of the clocked third row.

At 112, the method includes utilizing the CFD model with the original boundary conditions and the modified airfoil parameter or parameters of the airfoils of the second row. The results of the CFD model may be used to reanalyze the various wake parameters along the span of the airfoils of the third row as determined in at 106, so as to determine the effects of the modifications to the airfoil design parameters of the airfoils of the second row. In particular embodiments, the results of the CFD model may be used to determine the effect of the airfoil design modifications on the wake width at one or more of the span locations previously analyzed in step 106 and/or correlated to the performance parameters chosen in step 108.

At 114, the method 100 includes comparing the results of step 112 to a predetermined wake parameter target range so as to determine if the airfoil design parameter modification had a desired effect. If the wake parameter such as the wake width determined by step 112 falls within the predetermined target range and/or realized a desired effect on the chosen performance parameter from step 108, the method may end at step 114. However, if the results of step 114 fail to provide the desired effect, steps 110 through 114 or any of the steps 102-114 may be repeated until the desired effect is realized. Once the design of the airfoil of the second row has been optimized, the airfoils may be introduced to the gas turbine at assembly and/or at the next scheduled outage.

In a particular embodiment, the three adjacent rows of airfoils 66 may be chosen from the turbine section 30. The first row comprising stator blades 52, the second row comprising rotor blades 50 and the third row comprising stator blades 52. The third row 72 is clocked at some angular position relative to the first row 68. The unsteady CFD model is utilized to determine the wake width 90 along the radial span 64 at or generally adjacent to and substantially coincident to the leading edge 74 of the stator blades 52 of the third row 72. The wake width 90 may comprise of a thermal and/or a pressure wake 84. The wake width 90 may be determined at a first point generally adjacent to a point at fifty percent of the radial span 64 of the stator blades 52 of the third row 72. In addition or in the alternative, the wake width 90 may be determined at or adjacent to a point generally adjacent to one hundred percent of the radial span 64 of the stator blades 52 of the third row 72. The performance parameter may be one or any combination of those listed in step 108. In the alternative, the performance parameter may be some other performance parameter not listed. Stagger angle of the rotor blades 50 of the second row 70 may be increased by some angle such as about five degrees so as to front load the rotor blades 50, thereby narrowing the wake width 90 at or near the one hundred percent points along the radial span 64 of the stator blades 52 of the third row. Stagger angle of the rotor blades 50 of the second row 70 may be decreased by some angle such as about five degrees so as to aft load the rotor blades 50, thereby widening the wake width 90 at or near the fifty percent points along the radial span 64 of the stator blades 52 of the third row. The effect of the rotor blade 50 modification on the wake width 90 may be analyzed by re-utilizing the unsteady CFD model with the modified airfoil design parameter. If the modified wake width 90 falls within a predetermined target range that is correlated to the performance parameter to be modified, the method may be stopped. If not, some or all of steps 102 through 114 may be repeated until the desired effect is realized.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for modifying gas flow within a gas turbine where the gas flow originates from a row of rotor blades disposed axially between a first row of stator blades and a second row of stator blades where the second row of stator blades is clocked with respect to the first row of stator blades, wherein the method comprises:
   a, determining a wake parameter of a gas flow wake at one or more radial positions within a gas flow volume defined between trailing edges of the rotor blades and upstream from trailing edges of the stator blades of the second row of stator blades via an unsteady computational fluid dynamics model;
   b. modifying at least one rotor blade design parameter for the rotor blades in the unsteady computational fluid dynamics model in such a manner so as to increase or decrease the wake parameter to a predefined target range, wherein modifying at least one rotor blade design parameter in the unsteady computational fluid dynamics model includes modifying at least one rotor blade design parameter such that the wake width is narrower at a first radial location along the radial span of the stator blades of the second row and wider at a second radial location along the radial span of the stator blades of the second row;
   c, verifying that the increase or the decrease in the wake parameter falls within the predefined target range via the unsteady computational fluid dynamics model; and
   d. wherein if the wake parameter falls within the predefined target range, the method further includes retrofitting the gas turbine with replacement rotor blades which conform to the modified rotor blade design parameter and if the wake parameter falls outside of the predefined target range, the method includes repeating steps a, b and c.

2. The method as in claim 1, wherein the wake parameter comprises a circumferential wake width of the gas flow.

3. The method as in claim 2, wherein the wake width is determined by analyzing circumferential entropy distribution.

4. The method as in claim 1, wherein the wake parameter comprises a radial height of the gas flow wake as measured between a root portion and a radial tip portion of the stator blades of the second row of stator blades.

5. The method as in claim 1, wherein the wake parameter of the gas flow wake is determined at multiple radial positions within the gas flow volume so as to identify a radial and circumferential shape of the wake.

6. The method as in claim 1, wherein determining the wake parameter of the as flow wake at one or more radial positions within the gas flow volume comprises defining the wake parameter at an axial position which is proximate to leading edges of the stator blades of the second row of stator blades.

7. The method as in claim 1, further comprising utilizing an unsteady Navier-Stokes computational fluid dynamics computer model to determine the wake parameter.

8. The method as in claim 1, wherein the first row of stator blades, the row of rotor blades and the second row of stator blades are modeled from a compressor of the gas turbine or a turbine of the gas turbine.

9. The method as in claim 1, wherein modifying at least one rotor blade design parameter for the rotor blades in the unsteady computational fluid dynamics model comprises modifying at least one of stagger angle, curvature, lean, tilt, number of rotor blades, rotor blade platform shape and span height of the rotor blades.

10. A method for modifying gas flow within a gas turbine where the gas flow originates from a row of stator blades disposed axially between a first row of rotor blades and a second row of rotor blades where the second row of rotor blades is clocked with respect to the first row of rotor blades, wherein the method comprises:
   a. determining a wake parameter of a gas flow wake at one or more radial positions within a gas flow volume defined between trialing edges of the stator blades and upstream from trailing edges of the rotor blades of the second row of rotor blades via an unsteady computational fluid dynamics model;
   b. modifying at least one stator blade design parameter for the stator blades in the unsteady computational fluid dynamics model in such a manner so as to increase or decrease the wake parameter at one or more radial positions within the gas flow volume to a predefined target range, wherein modifying at least one stator blade design parameter for the stator blades in the unsteady computational fluid dynamics model includes modifying at least one stator blade design parameter such that the wake width is narrower at a first radial location along the radial span of the rotor blades of the second row and wider at a second radial location along the radial span of the rotor blades of the second row;
   c. verifying that the increase or the decrease in the wake parameter falls within the predefined target range via the unsteady computational fluid dynamics model; and
   d. wherein if the wake parameter falls within the predefined target range, the method further includes retrofitting the gas turbine with replacement stator blades which conform to the modified stator blade design parameter and if the wake parameter falls outside of the predefined target range, the method includes repeating steps a, b and c.

11. The method as in claim 10, wherein the wake parameter comprises a circumferential wake width of the gas flow.

12. The method as in claim 11, wherein the wake width is determined by analyzing circumferential entropy distribution.

13. The method as in claim 10, wherein the wake parameter comprises a radial height of the gas flow wake as measured between a root portion and a radial tip portion of the rotor blades of the second row of rotor blades.

14. The method as in claim 10, wherein the wake parameter of the gas flow wake is determined at multiple radial positions within the gas flow volume so as to identify a radial and circumferential shape of the wake.

15. The method as in claim 10, wherein determining the wake parameter of the gas flow wake at one or more radial positions within the gas flow volume comprises defining the wake parameter at an axial position which is proximate to leading edges of the rotor blades of the second row of rotor blades.

16. The method as in claim 10, further comprising utilizing an unsteady Navier-Stokes computational fluid dynamics computer model to determine the wake parameter.

17. The method as in claim 10, wherein the first row of rotor blades, the row of stator blades and the second row of rotor blades are modeled from a compressor of the gas turbine or a turbine of the gas turbine.

18. The method as in claims 10, wherein modifying at least one stator blade design parameter for the stator blades in the unsteady computational fluid dynamics model comprises modifying at least one of stagger angle, curvature, lean, tilt, number of stator blades, stator blade platform shape and span height of the stator blades.

* * * * *